US011683583B2

(12) United States Patent
Ma et al.

(10) Patent No.: US 11,683,583 B2
(45) Date of Patent: Jun. 20, 2023

(54) PICTURE FOCUSING METHOD, APPARATUS, TERMINAL, AND CORRESPONDING STORAGE MEDIUM

(71) Applicant: KANDAO TECHNOLOGY CO., LTD., Guangdong (CN)

(72) Inventors: Rui Ma, Shenzhen (CN); Panpeng Li, Shenzhen (CN)

(73) Assignee: KANDAO TECHNOLOGY CO., LTD., Guangdong (CN)

(*) Notice: Subject to any disclaimer, the term of this patent is extended or adjusted under 35 U.S.C. 154(b) by 153 days.

(21) Appl. No.: 17/423,481

(22) PCT Filed: Jan. 16, 2020

(86) PCT No.: PCT/CN2020/072511
§ 371 (c)(1),
(2) Date: Jul. 16, 2021

(87) PCT Pub. No.: WO2020/147790
PCT Pub. Date: Jul. 23, 2020

(65) Prior Publication Data
US 2022/0103743 A1    Mar. 31, 2022

(30) Foreign Application Priority Data
Jan. 18, 2019   (CN) .......................... 201910046700.7

(51) Int. Cl.
*H04N 23/67*        (2023.01)
*G06T 7/50*         (2017.01)
(Continued)

(52) U.S. Cl.
CPC .............. *H04N 23/67* (2023.01); *G06T 7/50* (2017.01); *G06V 10/82* (2022.01); *G06V 20/40* (2022.01); *G06T 2207/10016* (2013.01)

(58) Field of Classification Search
CPC .... H04N 23/67; H04N 23/673; H04N 23/675; H04N 23/61; H04N 23/611;
(Continued)

(56) References Cited

U.S. PATENT DOCUMENTS 10,902,265 B2 *  1/2021  Nicholson ............... H04W 4/02
11,048,913 B2 *  6/2021  Zhuo ................... H04N 23/675
(Continued)

FOREIGN PATENT DOCUMENTS

CN    103795934    5/2014
CN    104253939    12/2014
(Continued)

OTHER PUBLICATIONS

"International Search Report (Form PCT/ISA/210) of PCT/CN2020/072511," dated Apr. 7, 2020, with English translation thereof, pp. 1-5.

*Primary Examiner* — Michael S Osinski
(74) *Attorney, Agent, or Firm* — JCIP Global Inc.

(57) ABSTRACT

Provided by the present invention is a picture focusing method, comprising: acquiring a video picture, and, according to an instruction command, determining a target object in the video picture; determining picture depth information of a video picture region in which the target object is located; acquiring parameter information of a camera corresponding to multiple video picture frames; using the picture depth information of the video picture region and the parameter information of the camera as the input of a preset focusing neural network model; and using focus adjustment information of the camera to perform a focus adjustment operation on the camera.

11 Claims, 6 Drawing Sheets

(51) Int. Cl.
*G06V 10/82* (2022.01)
*G06V 20/40* (2022.01)

(58) Field of Classification Search
CPC .. H04N 23/667; H04N 23/672; H04N 25/704; H04N 23/80; G06T 7/50; G06T 2207/10016; G06T 2207/20081; G06T 2207/20084; G06T 2207/10028; G06T 7/73; G06V 10/82; G06V 20/40; G06V 10/147; G06V 20/00; G06V 10/25; G06V 10/751; G06V 10/764; G06V 20/20; G06V 40/161; G06N 20/00; G06F 18/24; G06F 18/24143

See application file for complete search history.

(56) References Cited

U.S. PATENT DOCUMENTS

| | | | | |
|---|---|---|---|---|
| 11,055,580 | B2 * | 7/2021 | Amon | G06F 18/2431 |
| 11,361,536 | B2 * | 6/2022 | Chakravarty | G06V 10/82 |
| 2010/0177187 | A1 * | 7/2010 | Hedlund | G06T 7/90 |
| | | | | 382/134 |
| 2016/0373642 | A1 * | 12/2016 | Ito | G02B 7/36 |
| 2018/0198994 | A1 * | 7/2018 | Cardinaux | H04N 23/611 |
| 2019/0141254 | A1 * | 5/2019 | Kawarada | H04N 23/672 |
| 2019/0387175 | A1 * | 12/2019 | Kikuchi | H04N 23/667 |
| 2020/0007781 | A1 * | 1/2020 | Aoba | G06N 3/045 |
| 2020/0013190 | A1 * | 1/2020 | Li | G06T 7/248 |
| 2020/0050824 | A1 * | 2/2020 | Held | G06F 18/24143 |
| 2020/0050898 | A1 * | 2/2020 | Keen | G06F 18/2113 |
| 2022/0067902 | A1 * | 3/2022 | Dou | G06N 20/00 |
| 2022/0368877 | A1 * | 11/2022 | Kimura | G06T 7/593 |
| 2022/0383525 | A1 * | 12/2022 | Sabato | G06T 7/50 |

FOREIGN PATENT DOCUMENTS

| | | |
|---|---|---|
| CN | 106375650 | 2/2017 |
| CN | 106375651 | 2/2017 |
| CN | 107493432 | 12/2017 |
| CN | 107509031 | 12/2017 |
| JP | 2005173278 | 6/2005 |

* cited by examiner

PICTURE FOCUSING METHOD, APPARATUS, TERMINAL, AND CORRESPONDING STORAGE MEDIUM

CROSS-REFERENCE TO RELATED APPLICATION

This application is a 371 of international application of PCT application serial no. PCT/CN2020/072511, filed on Jan. 16, 2020, which claims the priority benefits of China Patent Application No. 201910046700.7, filed on Jan. 18, 2019. The entirety of each of the above mentioned patent applications is hereby incorporated by reference herein and made a part of this specification.

TECHNICAL FIELD

The present invention relates to the field of image processing technologies, in particular to a picture focusing method, apparatus, a terminal and a corresponding storage medium.

BACKGROUND TECHNIQUE

An existing automatic operation for pictures generally is that picture sharpness in each region of a picture is detected, then, depth information of each picture region is calculated based on the picture sharpness of each region of the picture, and finally, a picture focusing operation is performed according to the depth information of each picture region.

However, the picture sharpness of the picture region always changes during picture focusing, there may be a deviation in calculation of a sharpness difference in different picture shooting environments to affect the operation precision of the picture focusing operation, and therefore, the precision and accuracy of a focusing operation in an existing picture focusing method are relatively poor.

Therefore, it is necessary to provide a picture focusing method and apparatus to solve problems existing in the prior art.

SUMMARY

Technical Problem

Embodiments of the present invention provide a picture focusing method and apparatus which have relatively high precision of a focusing operation and improvement in accuracy of the focusing operation to solve the technical problem that the precision and accuracy of the focusing operation in an existing picture focusing method and apparatus are relatively poor.

Solutions of the Problem

Technical Solutions

An embodiment of the present invention provides a picture focusing method, including:

acquiring a video picture, and determining a target object in the video picture according to an instruction;

determining picture depth information of a video picture region where the target object is located according to sharpness change information of the video picture region where the target object is located in multiple video picture frames;

acquiring parameter information of a shooting camera corresponding to the multiple video picture frames;

enabling a preset focusing neural network model to output focusing adjustment information of the shooting camera corresponding to the video picture by taking the picture depth information of the video picture region and the parameter information of the shooting camera as inputs of the preset focusing neural network model; and performing a focusing operation on the shooting camera by using the focusing adjustment information of the shooting camera.

In the picture focusing method provided by the present invention, the picture focusing method further comprises:

acquiring a plurality of training video pictures with different picture depth information and training parameter information of the corresponding shooting camera;

acquiring training focusing adjustment information corresponding to each training video picture based on a manual focusing adjustment result; and performing machine training by taking the picture depth information of the training video pictures and the training parameter information of the shooting camera as inputs of a preset focusing neural network model framework and taking the training focusing adjustment information corresponding to the video pictures as outputs of the preset focusing neural network model framework to obtain a model parameter of the focusing neural network model framework, thereby acquiring the focusing neural network model.

In the picture focusing method provided by the present invention, the step of determining the picture depth information of the video picture region where the target object is located according to the sharpness change information of the video picture region where the target object is located in the multiple video picture frames comprises:

acquiring picture sharpness of the video picture region where the target object is located in the multiple video picture frames; and determining the picture depth information of the video picture region where the target object is located according to a difference of the picture sharpness of the adjacent video picture frames and a focusing distance of the shooting camera.

In the picture focusing method provided by the present invention, the step of determining the picture depth information of the video picture region where the target object is located according to the sharpness change information of the video picture region where the target object is located in the multiple video picture frames comprises:

acquiring highest picture sharpness values in the multiple video picture frames; and determining the picture depth information of the video picture region where the target object is located according to a difference of the highest picture sharpness values of the adjacent video picture frames and the focusing distance of the shooting camera.

In the picture focusing method provided by the present invention, the step of acquiring the parameter information of the shooting camera corresponding to the multiple video picture frames, comprises:

acquiring lens information, focusing information, camera position information and camera posture information of the shooting camera corresponding to the multiple video picture frames.

The present invention further provides a picture focusing apparatus, including:

a video picture acquisition module, configured to acquire a video picture, and determine a target object in the video picture according to an instruction;

a picture depth information determination module, configured to determine picture depth information of a video picture region where the target object is located according to sharpness change information of the video picture region where the target object is located in multiple video picture frames;

a parameter information acquisition module, configured to acquire parameter information of a shooting camera corresponding to the multiple video picture frames;

a focusing adjustment information output module, configured to enable a preset focusing neural network model to output focusing adjustment information of the shooting camera corresponding to the video picture by taking the picture depth information of the video picture region and the parameter information of the shooting camera as inputs of the preset focusing neural network model; and a focusing module, configured to perform a focusing operation on the shooting camera by using the focusing adjustment information of the shooting camera.

In the picture focusing apparatus provided by the present invention, the picture focusing apparatus further comprises:

a training input information acquisition module, configured to acquire a plurality of training video pictures with different picture depth information and training parameter information of the corresponding shooting camera;

a training output information acquisition module, configured to acquire training focusing adjustment information corresponding to each training video picture based on a manual focusing adjustment result; and a training module, configured to obtain a model parameter of a focusing neural network model framework through machine training by taking the picture depth information of the training video pictures and the training parameter information of the shooting camera as inputs of the preset focusing neural network model framework and taking the training focusing adjustment information corresponding to the video pictures as outputs of the preset focusing neural network model framework, thereby acquiring the focusing neural network model.

In the picture focusing apparatus provided by the present invention, the parameter information acquisition module is configured to acquire lens information, focusing information, camera position information and camera posture information of the shooting camera corresponding to the multiple video picture frames.

The present invention further provides a computer readable storage medium, storing instructions executed by a processor, wherein the instructions are loaded by one or more processors so that any one of the above-mentioned picture focusing methods is performed.

The present invention further provides a terminal, including a processor and a memory, wherein the memory stores a plurality of instructions, and the processor loads the instructions from the memory so as to perform any one of the above-mentioned picture focusing methods.

Advantageous Effects of the Invention

Advantageous Effects

Compared with a picture focusing method and apparatus in the prior art, the picture focusing method and apparatus in the present invention with the focusing adjustment operation is performed on the target object by using the focusing neural network model based on the picture depth information of the target object and the parameter information of the shooting camera, so that the precision and accuracy of the focusing operation may be effectively improved, and the technical problem that the precision and accuracy of the focusing operation in an existing picture focusing method and apparatus are relatively poor is effectively solved.

BRIEF DESCRIPTION OF THE DRAWINGS

Description of the Drawings

Figure 1:
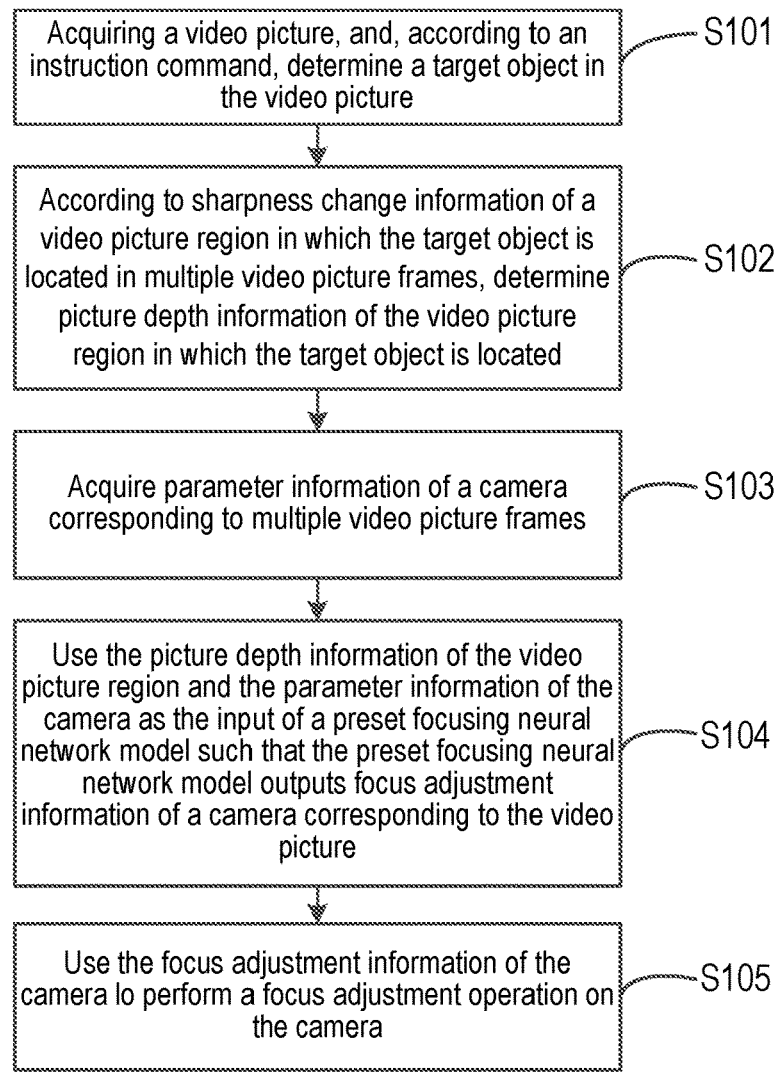
Figure 2:
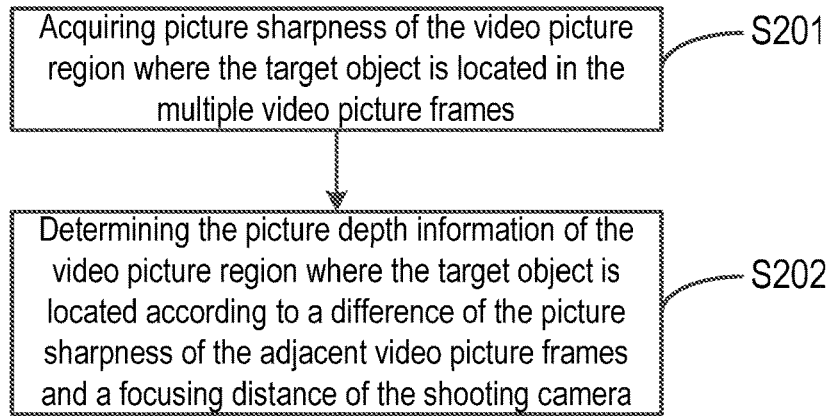
Figure 3:
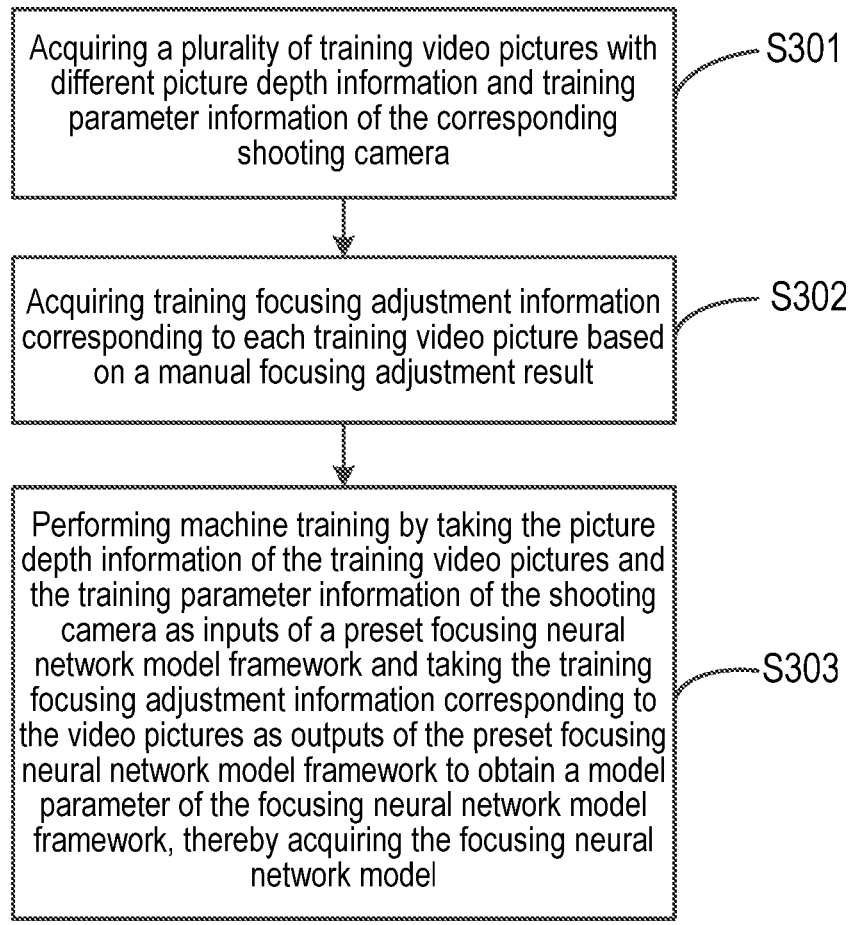
Figure 4:
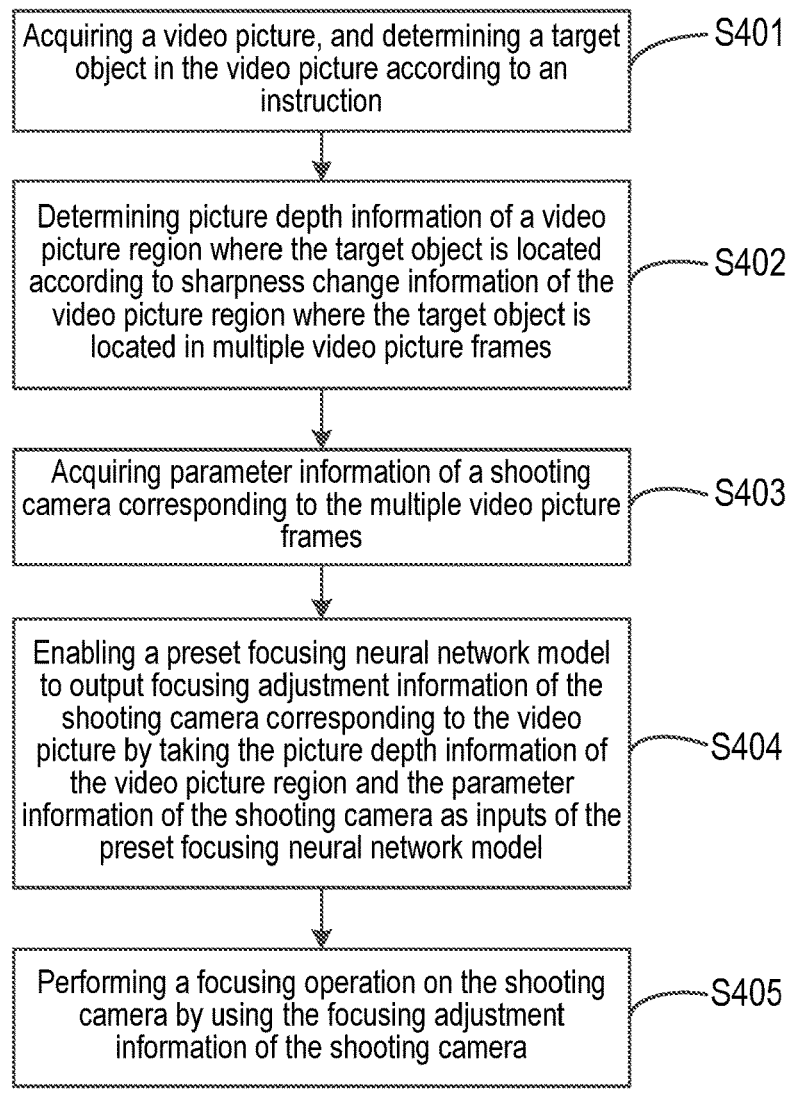
Figure 5:
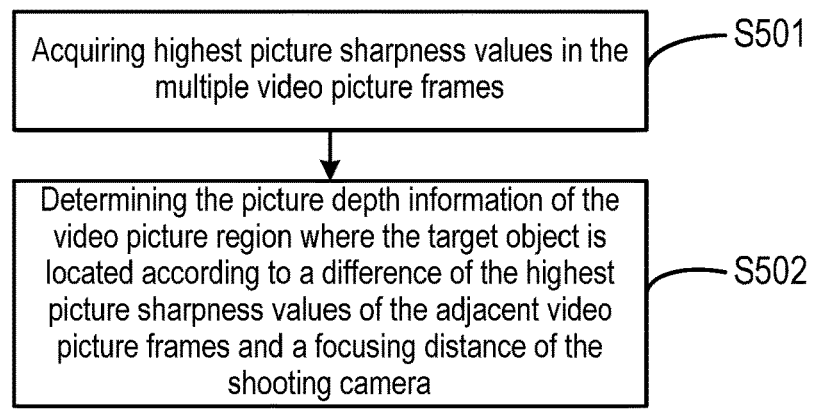
Figure 6:
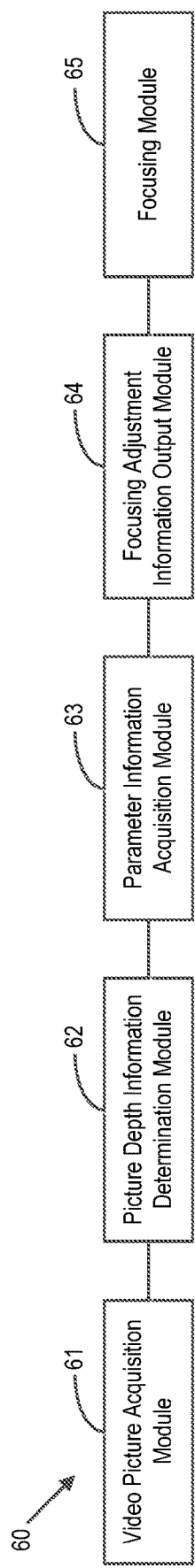
Figure 7:
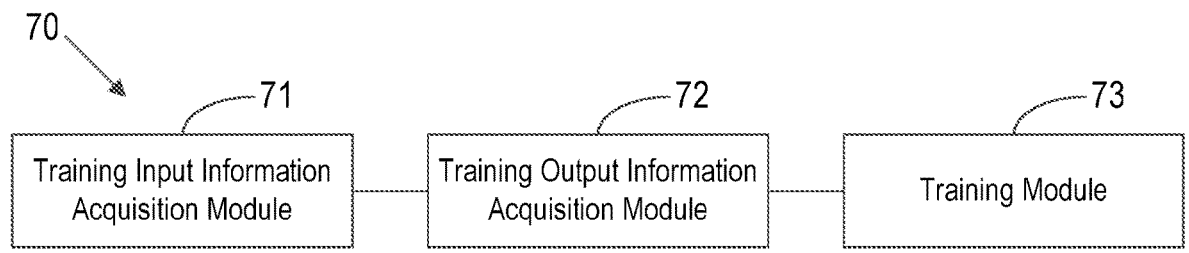
Figure 8:
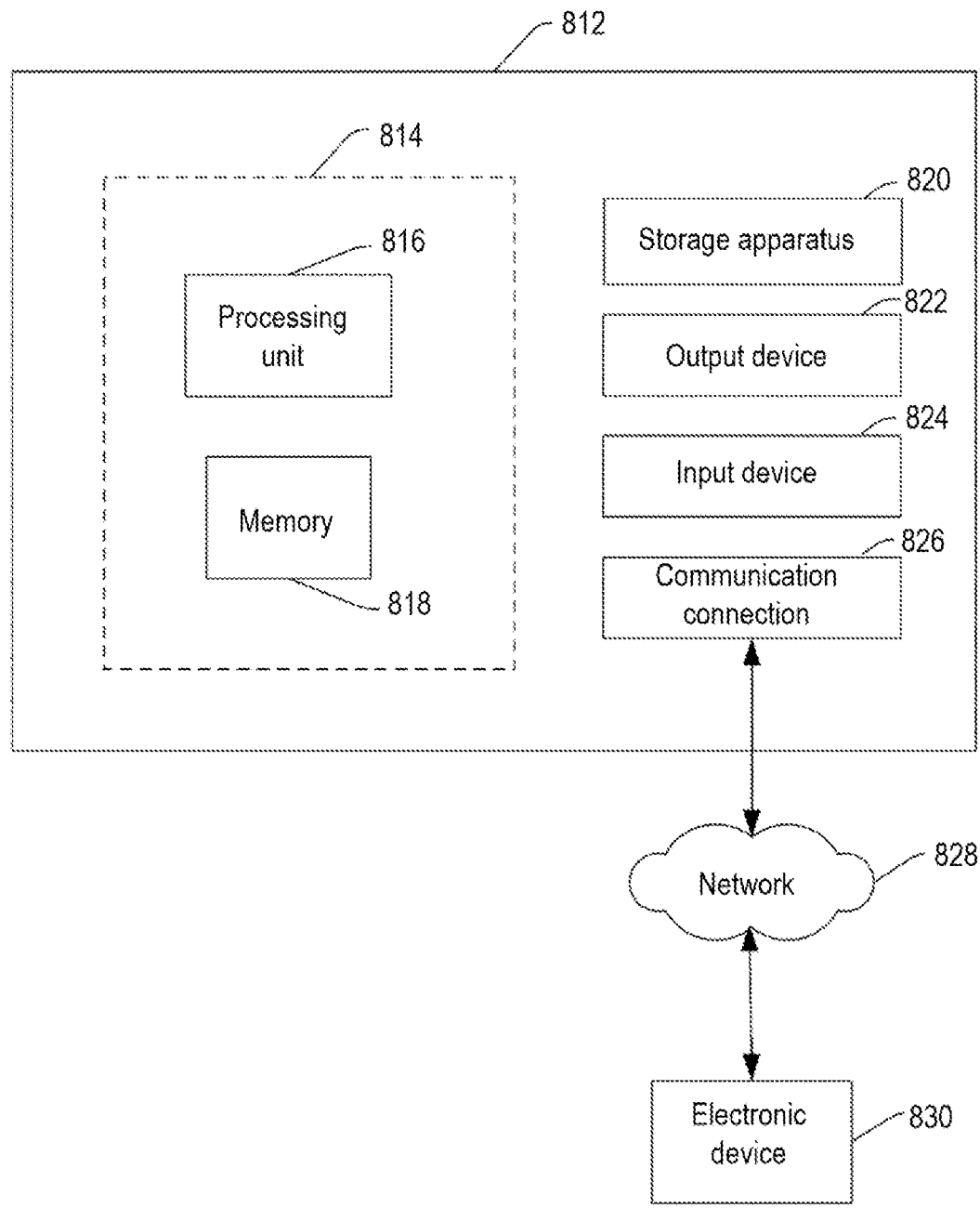

FIG. 1 is a flow diagram of a first embodiment of a picture focusing method of the present invention;

FIG. 2 is a flow diagram of step S102 in the first embodiment of the picture focusing method of the present invention;

FIG. 3 shows a model training process of a corresponding focusing neural network model in picture focusing method of the present invention;

FIG. 4 is a flow diagram of a second embodiment of a picture focusing method of the present invention;

FIG. 5 is a flow diagram showing step S402 in the second embodiment of the picture focusing method of the present invention;

FIG. 6 is a structural schematic diagram of a first embodiment of a picture focusing apparatus of the present invention;

FIG. 7 is a structural schematic diagram of model training relevant modules of a corresponding focusing neural network model of the picture focusing apparatus of the present invention;

FIG. 8 is a schematic diagram showing a structure of a working environment of an electronic device where the picture focusing apparatus provided by the present invention is located.

DESCRIPTION OF THE EMBODIMENTS

The technical solutions in embodiments of the present invention will be clearly and completely described below with reference to the accompanying drawings in the embodiments of the present invention. Obviously, the described embodiments are only a part of embodiments instead of all embodiments of the present invention. All other embodiments obtained by those of ordinary skill in the art based on the embodiments of the present invention without creative effects shall fall within the protection scope of the present invention.

A picture focusing method and apparatus provided by the present invention may be used in an electronic device for performing an automatic focusing operation on a shot picture. The electronic device includes, but is not limited to a wearable device, a head-mounted device, a medical health platform, a personal computer, a server computer, a handheld or laptop device, a mobile device (such as a mobile phone, a personal digital assistant (PDA) and a media player), a multi-processor system, a consumer electronic device, a small-size computer, a large-scale computer, a distributed computing environment including any above-mentioned systems or devices, etc. The electronic device is preferably an electronic shooting terminal capable of shooting photos or videos so that the automatic focusing operation is performed on shot pictures or videos. According to the electronic device provided by the present invention, a focusing adjustment operation is performed on a target object in a shot picture by using a focusing neutral network model based on picture depth information of the target object and parameter information of the shooting camera, and therefore, the precision and accuracy of the focusing operation may be effectively improved.

Referring to FIG. 1, FIG. 1 is a flow diagram of a first embodiment of a picture focusing method of the present invention. The picture focusing method in the present embodiment may be performed by using the above-mentioned electronic device. The picture focusing method includes:

step S101, a video picture is acquired, and a target object in the video picture is determined according to an instruction;

step S102, picture depth information of a video picture region where the target object is located is determined according to sharpness change information of the video picture region where the target object is located in multiple video picture frames;

step S103, parameter information of a shooting camera corresponding to the multiple video picture frames is acquired;

step S104, the preset focusing neural network model outputs focusing adjustment information of the shooting camera corresponding to the video picture by taking the picture depth information of the video picture region and the parameter information of the shooting camera as inputs of the preset focusing neural network model; and step S105, a focusing operation is performed on the shooting camera by using the focusing adjustment information of the shooting camera.

Specific processes of all the steps of the picture focusing method of the present invention will be described below in detail.

In the step S101, a picture focusing apparatus (such as an electronic shooting terminal) acquires the video picture through a corresponding camera. Then, the picture focusing apparatus determines the target object in the video picture according to an instruction of a user. The instruction herein may be an instruction for the user to determine the target object in the video picture by clicking the video picture. The target object refers to an object considered by the user to be mainly displayed and concerned in the video picture.

In the step S102, the picture focusing apparatus acquires the multiple continuous video picture frames and then determines the picture depth information of the video picture region where the target object is located according to the sharpness change information of the video picture region where the target object is located in the multiple video picture frames. The multiple video picture frames herein are preferably multi-frame pictures captured in a zooming process of the camera or multi-frame pictures of the target object moving and changing in a picture, so that the continuity of sharpness change may be better.

Picture sharpness is a physical quantity reflecting the definition of a plane of an image and the sharpness of an edge of the image. Herein, the sharpness change information of the video picture region where the target object is located refers to a variable quantity of the picture sharpness of the video picture region in a focusing process of the shooting camera for the video picture.

The picture sharpness is affected by a focusing distance of the shooting camera, and therefore, the focusing distance of the shooting camera, that is, the picture depth information of the video picture region where the target object is located, may be determined according to the variable quantity of the picture sharpness.

Referring to FIG. 2, FIG. 2 is a flow diagram of the step S102 in the first embodiment of the picture focusing method of the present invention. The step S102 includes that:

step S201, the picture focusing apparatus acquires picture sharpness of the video picture region where the target object is located in the multiple video picture frames; and step S202, the picture focusing apparatus determines the picture depth information of the video picture region where the target object is located according to a difference of the picture sharpness of the adjacent video picture frames and a focusing distance of the shooting camera.

Herein, the picture depth information is determined according to the change of the picture sharpness of the video picture region, that is, the picture sharpness value in the video picture region needs to be taken into account, so that the overall calculation process is relatively rapid, and the picture depth information of the video picture region may be better fed back.

In the step S103, the picture focusing apparatus acquires the parameter information of the shooting camera corresponding to the multiple video picture frames. Parameters of different shooting cameras may produce different influences on the focusing distance, and therefore, the parameter information of the shooting camera corresponding to the multiple video picture frames may be acquired in the present step. The parameter information includes, but is not limited to lens information, focusing information, camera position information and camera posture information of the shooting camera corresponding to the multiple video picture frames.

In the step S104, the picture focusing apparatus takes the picture depth information acquired in the step S102 and the parameter information of the shooting camera as inputs of a preset focusing neural network model, the focusing neural network model herein is a preset model outputting focusing adjustment information according to the picture depth information and the parameter information of the shooting camera, and the focusing neural network model may be trained in advance according to other focusing operation information.

In this way, the preset focusing neural network model may output the focusing adjustment information of the shooting camera corresponding to the video picture. A training method of the focusing neural network model will be described in detail hereinafter.

In the step S105, the picture focusing apparatus performs a focusing operation on the shooting camera by using the focusing adjustment information, acquired in the step S104, of the shooting camera.

In this way, a picture focusing process of the picture focusing method in the present embodiment is completed.

According to the picture focusing method in the present embodiment, the focusing adjustment operation is performed on the target object by using the focusing neural network model based on the picture depth information of the target object and the parameter information of the shooting camera, so that the precision and accuracy of the focusing operation may be effectively improved.

Referring to FIG. 3, FIG. 3 is a model training process of a corresponding focusing neural network model in the picture focusing method of the present invention. The model training process includes the following steps.

Step S301, a plurality of training video pictures with different picture depth information and training parameter information of the corresponding shooting camera are acquired; and the training video pictures herein refer to a plurality of pictures for training the focusing neural network model, wherein target objects in the training video pictures may have different picture depth information. The training parameter information refers to parameter information of the shooting camera when the training video pictures are shot.

Step S302, training focusing adjustment information corresponding to each training video picture is acquired based on a manual focusing adjustment result; and a focusing operation is manually performed on the target objects in the training video pictures acquired in the step S301, and the corresponding manual focusing adjustment results are acquired. In this way, the picture focusing apparatus may acquire the training focusing adjustment information corresponding to the respective training video pictures according to the manual focusing adjustment results.

Step S303, the picture focusing apparatus obtains a model parameter of the focusing neural network model framework through machine training by taking the picture depth information of the training video pictures and the training parameter information of the shooting camera acquired in the step S301 as inputs of a preset focusing neural network model framework and taking the training focusing adjustment information corresponding to the video pictures acquired in the step S302 as outputs of the preset focusing neural network model framework, thereby acquiring the focusing neural network model.

In this way, the training process of the focusing neural network model in the present embodiment is completed.

Referring to FIG. 4, FIG. 4 is a flow diagram of a second embodiment of a picture focusing method of the present invention. The picture focusing method in the present embodiment may be performed by using the above-mentioned electronic device. The picture focusing method includes that:

step S401, a video picture is acquired, and a target object in the video picture is determined according to an instruction;

step S402, picture depth information of a video picture region where the target object is located is determined according to sharpness change information of a video picture region where the target object is located in multiple video picture frames;

step S403, parameter information of a shooting camera corresponding to the multiple video picture frames is acquired;

step S404, a preset focusing neural network model outputs focusing adjustment information of the shooting camera corresponding to the video picture by taking the picture depth information of the video picture region and the parameter information of the shooting camera as inputs of the preset focusing neural network model; and step S405, a focusing operation is performed on the shooting camera by using the focusing adjustment information of the shooting camera.

Specific processes of all the steps of the picture focusing method provided by the present invention will be described below in detail.

The step S401 is the same as or similar to descriptions in the step S101 in the first embodiment of the above-mentioned picture focusing method, and specifically refers to the relevant descriptions in the step S101 in the first embodiment of the above-mentioned picture focusing method.

In the step S402, the picture focusing apparatus acquires the multiple continuous video picture frames and then determines the picture depth information of the video picture region where the target object is located according to the sharpness change information of the video picture region where the target object is located in the multiple video picture frames.

The picture sharpness is affected by a focusing distance of the shooting camera, and therefore, the focusing distance of the shooting camera, that is, the picture depth information of the video picture region where the target object is located, may be determined according to a variable quantity of the picture sharpness.

Referring to FIG. 5, FIG. 5 is a flow diagram of the step S402 in the second embodiment of the picture focusing method of the present invention. The step S402 includes that:

step S501, the picture focusing apparatus acquires highest picture sharpness values in the multiple video picture frames.

step S502, the picture focusing apparatus determines the picture depth information of the video picture region where the target object is located according to a difference of the highest picture sharpness values of the adjacent video picture frames and the focusing distance of the shooting camera.

Herein, the picture depth information is determined according to the change of the highest picture sharpness values of the overall video picture frames. Due to the consideration of all sharpness information of the overall video picture frames, the accuracy of the calculated picture depth information is higher.

The steps S403 to S405 are the same as or similar to descriptions in the step S103 to S105 in the first embodiment of the above-mentioned picture focusing method, and specifically refer to the relevant descriptions in the steps S103 to S105 in the first embodiment of the above-mentioned picture focusing method.

In this way, a picture focusing process of the picture focusing method in the present embodiment is completed.

Based on the first embodiment, the picture depth information of the video picture region is acquired based on the highest picture sharpness values of the video picture frames in the picture focusing method in the present embodiment, so that the accuracy of the acquired picture depth information is improved, and then, the precision and accuracy of the focusing operation are further improved effectively.

The present invention further provides a picture focusing apparatus. Referring to FIG. 6, FIG. 6 is a structural schematic diagram of a first embodiment of a picture focusing apparatus of the present invention. The picture focusing apparatus in the present embodiment may be executed by the above-mentioned picture focusing method. The picture focusing apparatus 60 includes a video picture acquisition module 61, a picture depth information determination module 62, a parameter information acquisition module 63, a focusing adjustment information output module 64 and a focusing module 65.

The video picture acquisition module 61 is configured to acquire a video picture, and determine a target object in the video picture according to an instruction; the picture depth information determination module 62 is configured to determine picture depth information of a video picture region where the target object is located according to sharpness change information of the video picture region where the target object is located in multiple video picture frames; the parameter information acquisition module 63 is configured to acquire parameter information of a shooting camera corresponding to the multiple video picture frames; the focusing adjustment information output module 64 is configured to enable a preset focusing neural network model to output focusing adjustment information of the shooting camera corresponding to the video picture by taking the picture depth information of the video picture region and the parameter information of the shooting camera as inputs of the preset focusing neural network model; and the focusing module 65 is configured to perform a focusing operation on the shooting camera by using the focusing adjustment information of the shooting camera.

When the picture focusing apparatus 60 in the present embodiment is used, firstly, the video picture acquisition module 61 (such as an electronic shooting terminal) acquires the video picture through the corresponding camera. Then, the video picture acquisition module 61 determines the target object in the video picture according to an instruction of a user. The instruction herein may be an instruction for determining the target object in the video picture by clicking the video picture. The target object refers to an object considered, by the user, to be mainly displayed and concerned in the video picture.

Then, the picture depth information determination module 62 acquires the multiple continuous video picture frames and then determines the picture depth information of the video picture region where the target object is located according to the sharpness change information of the video picture region where the target object is located in the multiple video picture frames. The multiple video picture frames herein are preferably multi-frame pictures captured in a camera zooming process or multi-frame pictures of the target object moving and changing in a picture, and thus, the continuity of sharpness change may be better.

Picture sharpness is a physical quantity reflecting the definition of a plane of an image and the sharpness of an edge of the image. Herein, the sharpness change information of the video picture region where the target object is located refers to a variable quantity of the picture sharpness of the video picture region in a focusing process of the shooting camera for the video picture.

The picture sharpness is affected by a focusing distance of the shooting camera, and therefore, the focusing distance of the shooting camera, that is, the picture depth information of the video picture region where the target object is located, may be determined by the variable quantity of the picture sharpness.

A process that the picture depth information is acquired specifically includes the following steps.

The picture depth information determination module 62 acquires picture sharpness of the video picture region where the target object is located in the multiple video picture frames.

The picture depth information determination module 62 determines the picture depth information of the video picture region where the target object is located according to a difference of the picture sharpness of the adjacent video picture frames and the focusing distance of the shooting camera.

Herein, the picture depth information is determined according to the change of the picture sharpness of the video picture region, that is, the picture sharpness in the video picture region needs to be taken into account, so that the overall calculation process is relatively rapid, and the picture depth information of the video picture region may be better fed back.

Next, the parameter information acquisition module 63 acquires the parameter information of the shooting camera corresponding to the multiple video picture frames. Parameters of different shooting cameras may produce different influences on the focusing distance, and therefore, the parameter information of the shooting camera corresponding to the multiple video picture frames may be acquired in the present step. The parameter information includes, but is not limited to, lens information, focusing information, camera position information and camera posture information of the shooting camera corresponding to the multiple video picture frames.

Then, the focusing adjustment information output module 64 takes the acquired picture depth information and the parameter information of the shooting camera as inputs of a preset focusing neural network model, the focusing neural network model herein is a preset model outputting focusing adjustment information according to the picture depth information and the parameter information of the shooting camera, and the focusing neural network model may be trained in advance by other focusing operation information.

In this way, the preset focusing neural network model may output the focusing adjustment information of the shooting camera corresponding to the video picture.

Finally, the focusing module 65 performs a focusing operation on the shooting camera by using the acquired focusing adjustment information of the shooting camera.

In this way, a picture focusing process of the picture focusing apparatus 60 in the present embodiment is completed.

According to the picture focusing apparatus in the present embodiment, the focusing adjustment operation is performed on the target object by using the focusing neural network model based on the picture depth information of the target object and the parameter information of the shooting camera, so that the precision and accuracy of the focusing operation may be effectively improved.

Referring to FIG. 7, FIG. 7 is a structural schematic diagram of a model training relevant module of a corresponding focusing neural network model of the picture focusing apparatus of the present invention. A picture focusing apparatus 70 includes a training input information acquisition module 71, a training output information acquisition module 72 and a training module 73.

The training input information acquisition module is configured to acquire a plurality of training video pictures with different picture depth information and training parameter information of the corresponding shooting camera; the training output information acquisition module is configured to acquire training focusing adjustment information corresponding to each training video picture based on a manual focusing adjustment result; and the training module is configured to obtain a model parameter of a focusing neural network model framework through machine training by taking the picture depth information of the training video pictures and the training parameter information of the shooting camera as inputs of the preset focusing neural network model framework and taking the training focusing adjustment information corresponding to the video pictures as outputs of the preset focusing neural network model framework, thereby acquiring the focusing neural network model.

A process that the focusing neural network model is trained by using the picture focusing apparatus in the present embodiment includes following steps:

The training input information acquisition module acquires a plurality of training video pictures with different picture depth information and training parameter information of the corresponding shooting camera; and the training video pictures herein refer to a plurality of pictures for training the focusing neural network model, wherein target objects in the training video pictures may have different picture depth information. The training parameter information refers to the parameter information of the shooting camera when the training video pictures are shot.

The training output information acquisition module acquires training focusing adjustment information corresponding to each training video picture based on a manual focusing adjustment result; and a focusing operation is manually performed on the target objects in the acquired training video pictures, and corresponding manual focusing adjustment results are acquired. In this way, the picture focusing apparatus may acquire the training focusing adjustment information corresponding to each training video picture according to each of the manual focusing adjustment results.

The training module obtains a model parameter of a focusing neural network model framework through machine training by taking the picture depth information of the training video pictures and the training parameter information of the shooting camera as inputs of the preset focusing neural network model framework and taking the training focusing adjustment information corresponding to the video pictures as outputs of the preset focusing neural network model framework, thereby acquiring the focusing neural network model.

In this way, the training process of the focusing neural network model in the present embodiment is completed.

According to the picture focusing method and apparatus provided by the present invention, the focusing adjustment operation is performed on the target object by using the focusing neural network model based on the picture depth information of the target object and the parameter information of the shooting camera, so that the precision and accuracy of the focusing operation may be effectively improved, and the technical problem that the precision and accuracy of the focusing operation in an existing picture focusing method and apparatus are relatively poor is effectively solved.

Terms such as "component", "module", "system", "interface" and "process" used in the present application generally refer to computer-relevant entities: hardware, a combination of hardware and software, software or software being executed. For example, the component can be, but not limited to a process running on a processor, the processor, an object, an executable application, an executed thread, a program and/or a computer. Shown by the drawings, an application running on a controller and the controller can be both components. One or more components can exist in the executed process and/or thread and can be located on one computer and/or distributed between two computers or among more computers.

FIG. 8 and the subsequent discussion provide brief and general descriptions for a working environment of an electronic device where the picture focusing apparatus provided by the present invention is located. The working environment shown in FIG. 8 is only an example of an appropriate working environment and is not intended to constitute any limitations on the range of applications or functions of the working environment. An exemplary electronic device 812 comprises, but is not limited to, a wearable device, a head-mounted device, a medical health platform, a personal computer, a server computer, a handheld or laptop device, a mobile device (such as a mobile phone, a personal digital assistant (PDA) and a media player), a multi-processor system, a consumer electronic device, a small-size computer, a large-scale computer, and a distributed computing environment comprising any of above-mentioned systems or devices.

Although not required, the embodiment is described under the general background that "computer readable instructions" are executed by one or more electronic devices. The computer readable instructions can be distributed by a computer readable medium (discussed below). The computer readable instructions are implemented as program modules such as functions, objects, application programming interfaces (API) and data structures for executing specific tasks or implementing specific abstract data types. Typically, the functions of the computer readable instructions can be randomly combined or distributed in various environments.

FIG. 8 illustrates an example of an electronic device 812 comprising one or more embodiments of the picture focusing apparatus provided by the present invention. In one configuration, the electronic device 812 comprises at least one processing unit 816 and a memory 818. According to the exact configuration and type of the electronic device, the memory 818 can be a volatile memory (such as an RAM), a non-volatile memory (such as an ROM and a flash memory) or a certain combination of the volatile memory and the non-volatile memory. The configuration is shown as a dotted line 814 in FIG. 8.

In other embodiments, the electronic device 812 can comprise additional features and/or functions. For example, the device 812 can further comprise an additional storage apparatus (for example, removable and/or non-removable), and comprises, but is not limited to, a magnetic storage apparatus and an optical storage apparatus. The additional storage apparatus is illustrated as a storage apparatus 820 in FIG. 8. In one embodiment, the computer readable instructions for implementing one or more embodiments provided herein can be stored in the storage apparatus 820. The storage apparatus 820 can further store other computer readable instructions for implementing an operating system and an application. The computer readable instructions can be loaded into the memory 818 so as to be executed by, for example, the processing unit 816.

The term "computer readable medium" used herein comprises a computer storage medium. The computer storage medium comprises a volatile medium, a non-volatile medium, a removable medium and a non-removable medium implemented by using any method or technology for storing information such as the computer readable instructions or other data. The memory 818 and the storage apparatus 820 are examples of the computer storage medium. The computer storage medium comprises, but is not limited to, an RAM, an ROM, an EEPROM, a flash memory or other memory technologies, a CD-ROM, a digital video disk (DVD) or other optical storage apparatuses, a cassette tape, a magnetic tape, a magnetic disk storage apparatus or other magnetic storage devices, or any other media which can be used for storing desired information and can be accessed by the electronic device 812. Any of such computer storage media can be a part of the electronic device 812.

The electronic device 812 can further comprise a communication connection 826 allowing the electronic device 812 to communicate with other devices. The communication connection 826 can comprise, but not limited to, a modem, a network interface card (NIC), an integrated network interface, a radio frequency transmitter/receiver, an infrared port, a USB connection or other interfaces for connecting the electronic device 812 to other electronic devices. The communication connection 826 can comprise wired connection or wireless connection. The communication connection 826 is capable of transmitting and/or receiving a communication medium.

The term "computer readable medium" can comprise a communication medium. The communication medium typically comprises computer readable instructions or other data in "modulated data signals" such as carriers or other transmission mechanisms, and comprises any information delivery medium. The term "modulated data signals" can comprise such signals that one or more of signal features are set or changed in a manner of encoding information into the signals.

The electronic device 812 can comprise an input device 824 such as a keyboard, a mouse, a pen, a voice input device, a touch input device, an infrared camera, a video input device and/or any other input devices. The device 812 can further comprise an output device 822 such as one or more displays, loudspeakers, printers and/or any other output devices. The input device 824 and the output device 822 can be connected to the electronic device 812 by wired connection, wireless connection or any combination thereof. In one embodiment, an input device or an output device of another electronic device can be used as the input device 824 or the output device 822 of the electronic device 812.

Components of the electronic device 812 can be connected by various interconnections (such as a bus). Such interconnections can comprise a peripheral component interconnect (PCI) (such as a quick PCI), a universal serial bus (USB), a fire wire (IEEE 1394), an optical bus structure and the like. In another embodiment, the components of the electronic device 812 can be interconnected by a network. For example, the memory 818 can be composed of a plurality of physical memory units located on different physical positions and interconnected by the network.

It will be appreciated by those skilled in the art that storage devices for storing the computer readable instructions can be distributed across the network. For example, an electronic device 830 which can be accessed by a network 828 is capable of storing computer readable instructions for implementing one or more embodiments provided by the present invention. The electronic device 812 is capable of accessing the electronic device 830 and downloading a part or all of the computer readable instructions to be executed. Alternatively, the electronic device 812 is capable of downloading a plurality of computer readable instructions as required, or some instructions can be executed on the electronic device 812, and some instructions can be executed on the electronic device 830.

Various operations in the embodiments are provided herein. In one embodiment, the one or more operations can constitute one or more computer readable instructions stored in the computer readable medium, and a computing device will be enabled to execute the operations when the computer readable instructions are executed by the electronic device. The order of describing some or all of the operations should not be construed as implying that these operations have to be relevant to the order, and will be understood, by those skilled in the art, as an alternative order having benefits of this description. Moreover, it should be understood that not all the operations have to exist in each embodiment provided herein.

Moreover, although the present disclosure has been shown and described relative to one or more implementation modes, those skill in the art will envision equivalent variations and modifications based on reading and understanding of this description and the accompanying drawings. All of such modifications and variations are included in the present disclosure and are only limited by the scope of the appended claims. Particularly, with respect to various functions executed by the above-mentioned components (such as elements and resources), terms for describing such components are intended to correspond to any component (unless other indicated) for executing specified functions of the components (for example, the components are functionally equivalent), even if the structures of the components are different from the disclosed structures for executing the functions in an exemplary implementation mode of the present disclosure shown herein. In addition, although a specific feature in the present disclosure has been disclosed relative to only one in several implementation modes, the feature can be combined with one or more other features in other implementation modes which can be desired and beneficial for a given or specific application. Moreover, as for terms "comprising", "having" and "containing" or variants thereof applied to the detailed description or claims, such terms means inclusion in a manner similar to the term "including".

All the functional units in the embodiments of the present invention can be integrated in a processing module, or each unit separately and physically exists, or two or more units are integrated in a module. The above-mentioned integrated module can be achieved in a form of either hardware or a software functional module. If the integrated module is achieved in the form of the software functional module and is sold or used as an independent product, the integrated module can also be stored in a computer readable storage medium. The above-mentioned storage medium can be a read-only memory, a magnetic disk or an optical disk and the like. All of the above-mentioned apparatuses and systems can execute the methods in the corresponding embodiments of the methods.

In summary, although the present invention has been disclosed as above in the embodiments, serial numbers in front of the embodiments are merely used for facilitating description, rather than limiting the order of all the embodiments of the present invention. Moreover, the above-mentioned embodiments are not intended to limit the present invention, those of ordinary skill in the art can make various changes and modifications without departing from the spirit and scope of the present invention, and therefore, the protection scope of the present invention is subject to the scope defined by the claims.

What is claimed is:

1. A picture focusing method, comprising the following steps:
   acquiring a video picture, and determining a target object in the video picture according to an instruction;
   determining picture depth information of a video picture region where the target object is located according to sharpness change information of the video picture region where the target object is located in multiple video picture frames;
   acquiring parameter information of a shooting camera corresponding to the multiple video picture frames;
   enabling a focusing neural network model, which is preset, to output focusing adjustment information of the shooting camera corresponding to the video picture by taking the picture depth information of the video picture region and the parameter information of the shooting camera as inputs of the focusing neural network model, which is preset; and
   performing a focusing operation on the shooting camera by using the focusing adjustment information of the shooting camera.

2. The picture focusing method according to claim 1, wherein the picture focusing method further comprises:
  acquiring a plurality of training video pictures with different picture depth information and training parameter information of the corresponding shooting camera;
  acquiring training focusing adjustment information corresponding to each training video picture based on a manual focusing adjustment result; and
  performing machine training by taking the picture depth information of the training video pictures and the training parameter information of the shooting camera as inputs of a preset focusing neural network model framework and taking the training focusing adjustment information corresponding to the video pictures as outputs of the preset focusing neural network model framework to obtain a model parameter of the focusing neural network model framework, thereby acquiring the focusing neural network model.

3. The picture focusing method according to claim 1, wherein the step of determining the picture depth information of the video picture region where the target object is located according to the sharpness change information of the video picture region where the target object is located in the multiple video picture frames comprises:
  acquiring picture sharpness of the video picture region where the target object is located in the multiple video picture frames; and
  determining the picture depth information of the video picture region where the target object is located according to a difference of the picture sharpness of the adjacent video picture frames and a focusing distance of the shooting camera.

4. The picture focusing method according to claim 3, wherein the step of determining the picture depth information of the video picture region where the target object is located according to the sharpness change information of the video picture region where the target object is located in the multiple video picture frames comprises:
  acquiring highest picture sharpness values in the multiple video picture frames; and
  determining the picture depth information of the video picture region where the target object is located according to a difference of the highest picture sharpness values of the adjacent video picture frames and the focusing distance of the shooting camera.

5. The picture focusing method according to claim 1, wherein the step of acquiring the parameter information of the shooting camera corresponding to the multiple video picture frames, comprises:
  acquiring lens information, focusing information, camera position information and camera posture information of the shooting camera corresponding to the multiple video picture frames.

6. A picture focusing apparatus, comprising:
  a video picture acquisition module, configured to acquire a video picture, and determine a target object in the video picture according to an instruction;
  a picture depth information determination module, configured to determine picture depth information of a video picture region where the target object is located according to sharpness change information of the video picture region where the target object is located in multiple video picture frames;
  a parameter information acquisition module, configured to acquire parameter information of a shooting camera corresponding to the multiple video picture frames;
  a focusing adjustment information output module, configured to enable a focusing neural network model, which is preset, to output focusing adjustment information of the shooting camera corresponding to the video picture by taking the picture depth information of the video picture region and the parameter information of the shooting camera as inputs of the focusing neural network model, which is preset; and
  a focusing module, configured to perform a focusing operation on the shooting camera by using the focusing adjustment information of the shooting camera.

7. The picture focusing apparatus according to claim 6, wherein the picture focusing apparatus further comprises:
  a training input information acquisition module, configured to acquire a plurality of training video pictures with different picture depth information and training parameter information of the corresponding shooting camera;
  a training output information acquisition module, configured to acquire training focusing adjustment information corresponding to each training video picture based on a manual focusing adjustment result; and
  a training module, configured to obtain a model parameter of a focusing neural network model framework through machine training by taking the picture depth information of the training video pictures and the training parameter information of the shooting camera as inputs of the preset focusing neural network model framework and taking the training focusing adjustment information corresponding to the video pictures as outputs of the preset focusing neural network model framework, thereby acquiring the focusing neural network model.

8. The picture focusing apparatus according to claim 6, wherein the picture depth information determination module is configured to acquire picture sharpness of the video picture region where the target object is located in the multiple video picture frames; and determine the picture depth information of the video picture region where the target object is located according to a difference of the picture sharpness of the adjacent video picture frames and a focusing distance of the shooting camera.

9. The picture focusing apparatus according to claim 8, wherein the picture depth information determination module is configured to acquire highest picture sharpness values in the multiple video picture frames; and determine the picture depth information of the video picture region where the target object is located according to a difference of the highest picture sharpness values of the adjacent video picture frames and the focusing distance of the shooting camera.

10. The picture focusing apparatus according to claim 6, wherein the parameter information acquisition module is configured to acquire lens information, focusing information, camera position information and camera posture information of the shooting camera corresponding to the multiple video picture frames.

11. A non-transitory computer readable storage medium, storing instructions executed by a processor, wherein the processor executes the instructions to provide a picture focusing method, comprising:
  acquiring a video picture, and determining a target object in the video picture according to an instruction;
  determining picture depth information of a video picture region where the target object is located according to sharpness change information of the video picture region where the target object is located in multiple video picture frames;

acquiring parameter information of a shooting camera corresponding to the multiple video picture frames;

enabling a preset focusing neural network model to output focusing adjustment information of the shooting camera corresponding to the video picture by taking the picture depth information of the video picture region and the parameter information of the shooting camera as inputs of the preset focusing neural network model; and performing a focusing operation on the shooting camera by using the focusing adjustment information of the shooting camera.

\* \* \* \* \*